Sept. 2, 1958  E. W. HAWKINSON  2,850,263
ATTACHMENT FOR TIRE SPREADERS
Filed May 14, 1956

INVENTOR.
Earle W. Hawkinson
BY
Merchant & Merchant
ATTORNEYS

United States Patent Office 2,850,263
Patented Sept. 2, 1958

2,850,263

ATTACHMENT FOR TIRE SPREADERS

Earle W. Hawkinson, Minneapolis, Minn., assignor to Paul E. Hawkinson Company, Minneapolis, Minn., a corporation of Minnesota Application May 14, 1956, Serial No. 584,506

2 Claims. (Cl. 254—50.3)

My invention relates to devices for use in spreaders for pneumatic tire casings and more particularly to spreaders of the type which engage the relatively inflexible bead portions of the tire casing at circumferentially spaced points.

In the use of tire spreaders of the type above described it has been found that the relatively inflexible bead portions of the tire casing are frequently bent, fractured or otherwise damaged by engagement with the circumferentially spaced spreader heads therewith. With the advent of the tubeless tire, it has become increasingly important that the bead portions be not damaged, or in any manner engaged during the spreading process, so as not to interfere with the rim-engaging-pressure-sealing qualities thereof.

The primary object of my invention is the provision of a novel device which may be readily attached to and detached from the bead portions of a pneumatic tire casing so as to assure uniform spreading pressure being exerted uniformly about the bead portions during spreading movements thereof.

A still further object of my invention is the provision of a device in the class immediately above described which comprises a plurality of arcuate sections adjacent ends of which are hingedly secured together to form an annular rim, said rim defining an endless radially outwardly opening channel adapted to receive one bead portion of a pneumatic tire casing to be spread thereby, the axially inner wall of said channel being directly engageable with the circumferentially spaced spreader elements of a conventional pneumatic tire spreader.

A still further object of my invention is the provision of a device in the class immediately above described in which the inner wall of the channel projects radially outwardly a greater distance than the axially outer wall thereof, said inner wall projecting radially outwardly beyond the metallic tire bead and there terminating in axially outwardly projecting circumferentially extended rib which engages the sidewall of the tire radially outwardly of said bead.

A still further object of my invention is the provision of a device in the class immediately above described in which the axially outer wall of said channel terminates in radially inwardly spaced relationship to the annular rim-flange-engaging seal-forming-portion of the tire casing.

A still further object of my invention is the provision of a device in the class above described in which the diameter of said rim at the base of the channel corresponds approximately to the opening in said tire casing defined by said bead portions, and in which the space between the walls of said channel is sufficiently greater than the axial width of the bead portions received therein to permit rocking movements of said bead portion during spreading movements of said casing.

The above and still further objects of my invention will become apparent from the following detailed specification, appended claims and attached drawings.

Referring to the drawings wherein like characters indicate like parts throughout the several views.

Figure 1:
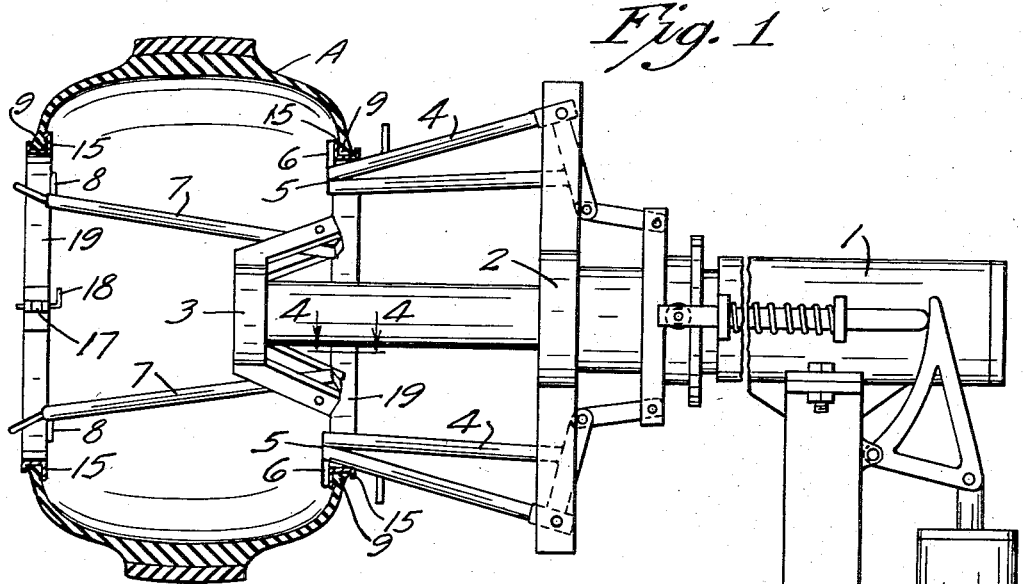
Fig. 1 is a fragmentary view in side elevation of a conventional tire spreader illustrating use of same spreading a pneumatic tire casing with my novel device, the tire casing and my device being shown in transverse vertical section.

Referring with greater particularity to the drawings, the numeral 1 indicates in its entirety a conventional tire spreader of the type disclosed in U. S. Patent 1,943,784, and comprising a pair of mounting heads 2 and 3 respectively, mounted and guided for movements toward and away from each other on a common axis. Carried by and pivotally secured to the mounting head 2, for swinging movements generally radially of the axis thereof, are a plurality of spreader arms 4, the free ends 5 of which are provided with spreader heads 6. Carried by and pivotally secured to the mounting head 3 for swinging movements generally radially of the axis thereof are a plurality of spreader arms 7 having spreader heads 8 at their free ends. The spreader arms 4 cooperate with the spreader arms 7 to provide cooperating pairs of spreader arms adapted to engage the opposite bead portions 9 of a tire casing A, as shown in Fig. 1.

Figure 4:
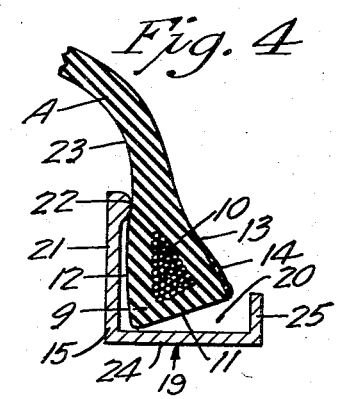
Fig. 4 is an enlarged fragmentary sectional view taken substantially on the line 4—4 of Fig. 1.

The bead portions 9 of the tire casing A, as shown particularly in Fig. 4, comprise conventional wire beads 10 and define radially inner surfaces 11, axially inner surfaces 12 and axially outer surfaces 13. The radially outer portions of the surfaces 13 define a continuous circumferentially extended band 14 of relatively soft rubber-like material which makes pressure sealing engagement with the rim flange of a conventional wheel-mounting rim, not shown. It will be noted that the annular sealing band or surface 14 is radially outwardly spaced, but concentric to the inner surface 11.

Figure 2:
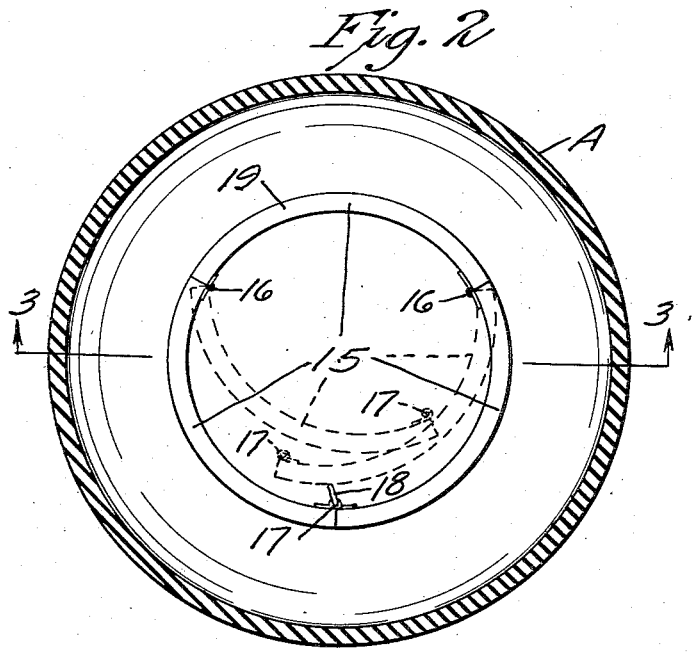
Fig. 2 is a view in vertical section of a tire casing showing my novel structure attached thereto.
Figure 3:
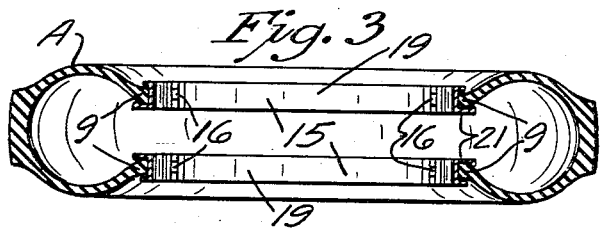
Fig. 3 is a view in transverse section taken on the line 3—3 of Fig. 2.

My invention comprises a plurality of arcuate sections 15 adjacent ones of which are hingedly secured together as at 16 to permit inward collapsing movements thereof, as indicated by the dotted lines of Fig. 2, for purposes in attachment and detachment. Abutting ends of a given pair of sections 15 are provided with means for detachably locking same together in the annular full line operating position of Fig. 2, said locking means comprising axially alignable eyes 17 through which a removable pin 18 is adapted to pass. When in their operative positions, the arcuate sections 15 provide rims 19 which cooperate to define endless radially outwardly opening channels 20 each adapted to receive one bead portion 9 of a pneumatic tire A. As shown in Figs. 1 and 3, two rims 19 are required for the spreading operation, one for each bead portion 9.

Rims 19 include axially inner walls 21 which project radially outwardly beyond the bead 10 of the tire casing A to be spread thereby, and terminate at their radially outer edge portions in axially outwardly projecting unbroken ribs 22 which engage the inner sidewall surfaces 23 of the tire casing A radially outwardly of said beads 10. The felly band forming portion 24 of the rims 19 are substantially the same diameter as the inner surfaces 11 of the bead portions 9 of the tire casing A.

The axially outer walls 25 of the channel forming rims 19 extend radially outwardly, in unbroken circumferentially extended relationship, a less distance than the axially inner walls 21, and preferably and as shown, terminate below the annular rim-flange-engaging seal-forming portions 14.

By the novel arrangement above described, it should be obvious that, the primary spreading force is exerted upon the inner sidewall 23 of the casing A through the medium of the circumferentially extended unbroken rib 22. Furthermore, due to the fact that the space between the channel forming walls 21, 25 of the rim 19 are spaced apart a distance greater than the transverse width of the bead portions 9, said bead portions 9 are permitted to roll freely within the channel 20 during spreading movements without detrimental engagement of any portion of the rims 19 therewith. Note particularly that the sealing band forming surfaces 14 are so radially spaced with respect to the axially outer walls 25, that no engagement is made therebetween at any time.

My invention has been thoroughly tested and found to be completely satisfactory for the accomplishment of the above objects, and while I have disclosed a preferred embodiment thereof, I wish it to be specifically understood that same is capable of considerable modification without departure from the scope and spirit of the appended claims.

What I claim is:

1. Tire bead receiving rims for direct engagement by the opposed circumferentially spaced spreader arms of a pneumatic tire spreader, said rims comprising a plurality of arcuate sections hingedly secured together in end to end relationship and each defining an endless radially outwardly opening channel adapted to receive one bead portion of a pneumatic tire casing, the axially inner walls of said channels projecting radially outwardly a greater distance than the axially outer walls thereof, said axially inner walls projecting radially outwardly beyond said bead portions therein and defining axially projecting circumferentially extended ribs which engage the adjacent inner side wall of said tire radially outwardly of said bead portions, the space between the walls of said channels being sufficiently greater than the axial width of said bead portions of the tire casing received therein to permit rocking movements of said bead portions during spreading movements exerted thereon through said spreader arms.

2. Tire bead receiving rims for direct engagement by the opposed circumferentially spaced spreader arms of a pneumatic tire spreader, said rims comprising a plurality of arcuate sections hingedly secured together in end to end relationship and each defining an endless radially outwardly opening channel adapted to receive one bead portion of a pneumatic tire casing, the axially inner walls of said channels projecting radially outwardly beyond said bead portions therein and defining axially projecting circumferentially extended ribs which engage the adjacent inner side wall of said tire radially outwardly of said bead portions, the space between the walls of said channels being sufficiently greater than the axial width of said bead portions of the tire casing received therein to permit rocking movements of said bead portions during spreading movements exerted thereon through said spreader arms.

References Cited in the file of this patent

UNITED STATES PATENTS

| | | |
|---|---|---|
| 1,767,710 | Smith | June 24, 1930 |
| 1,908,311 | Branick | May 9, 1933 |
| 2,525,114 | Branick | Oct. 10, 1950 |
| 2,665,883 | Glynn | Jan. 12, 1954 |